United States Patent
Sadhvani

(10) Patent No.: US 9,069,398 B1
(45) Date of Patent: Jun. 30, 2015

(54) ELECTRONIC DEVICE HAVING A TOUCH PANEL DISPLAY AND A METHOD FOR OPERATING THE SAME

(75) Inventor: Rita Sadhvani, Watchung, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 1178 days.

(21) Appl. No.: 12/362,984

(22) Filed: Jan. 30, 2009

(51) Int. Cl.
*G06F 3/041* (2006.01)
*G06F 3/033* (2013.01)

(52) U.S. Cl.
CPC .............. *G06F 3/041* (2013.01); *G06F 3/033* (2013.01)

(58) Field of Classification Search
CPC ........... G09G 5/00; G06F 3/041; G06F 3/033; G06F 3/044; G06F 3/0488; G06F 3/04883
USPC ........................................................ 715/863
See application file for complete search history.

(56) References Cited

U.S. PATENT DOCUMENTS

| | | | | |
|---|---|---|---|---|
| 5,861,886 A * | 1/1999 | Moran et al. | ................... | 715/863 |
| 6,054,990 A * | 4/2000 | Tran | ................... | 715/863 |
| 6,088,731 A * | 7/2000 | Kiraly et al. | ................... | 709/229 |
| 6,211,856 B1 * | 4/2001 | Choi et al. | ................... | 345/666 |
| 6,525,749 B1 * | 2/2003 | Moran et al. | ................... | 715/863 |
| 6,639,584 B1 * | 10/2003 | Li | ................... | 345/173 |
| 7,446,783 B2 * | 11/2008 | Grossman | ................... | 345/660 |
| 7,944,215 B2 * | 5/2011 | Howard et al. | ................... | 324/654 |
| 8,044,939 B2 * | 10/2011 | Park | ................... | 345/173 |
| 8,448,083 B1 * | 5/2013 | Migos et al. | ................... | 715/781 |
| 2006/0232611 A1 * | 10/2006 | Brooke | ................... | 345/671 |
| 2007/0226646 A1 * | 9/2007 | Nagiyama et al. | ................... | 715/784 |
| 2008/0163130 A1 * | 7/2008 | Westerman | ................... | 715/863 |
| 2008/0165141 A1 | 7/2008 | Christie | | |
| 2008/0165145 A1 | 7/2008 | Herz et al. | | |
| 2008/0211778 A1 | 9/2008 | Ording et al. | | |
| 2009/0061948 A1 * | 3/2009 | Lee et al. | ................... | 455/566 |
| 2009/0265670 A1 * | 10/2009 | Kim et al. | ................... | 715/863 |
| 2009/0284482 A1 * | 11/2009 | Chin | ................... | 345/173 |
| 2010/0162181 A1 * | 6/2010 | Shiplacoff et al. | ................... | 715/863 |

OTHER PUBLICATIONS

NTT Docomo's "TouchFlo" Cell Phone, May 2008 http://www.nttdocomo.co.jp/product/smart_phone/ht1100/topics.01.html.

* cited by examiner

*Primary Examiner* — Towfiq Elahi

(57) ABSTRACT

A disclosed method for operating an electronic device having a touch panel display involves displaying an image on the touch panel display and detecting curved motion of a user input device touching and moving on the touch panel display. The detected curved motion at least substantially encompasses a portion on the displayed image. In response, the device enlarges or shrinks the displayed image on the touch panel display from a perspective encompassing the selected portion of the displayed image. The enlarging or shrinking of the displayed image on the touch panel display may continue during detection of the curved motion.

26 Claims, 10 Drawing Sheets

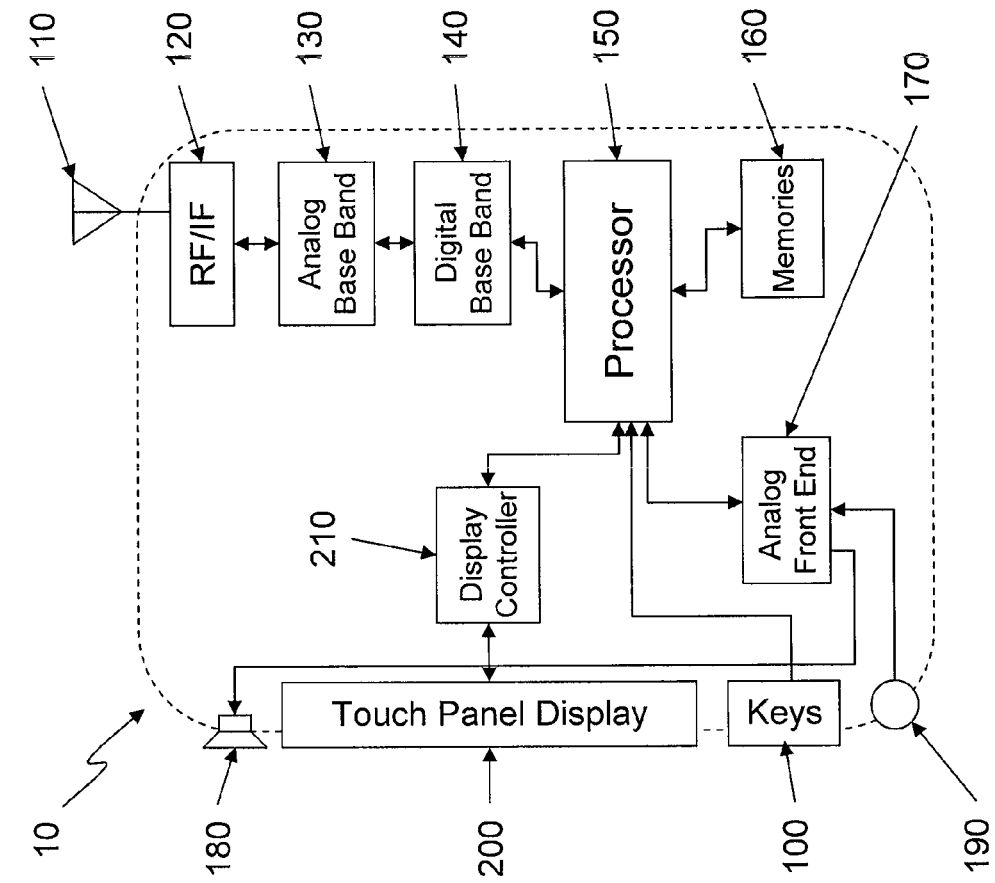
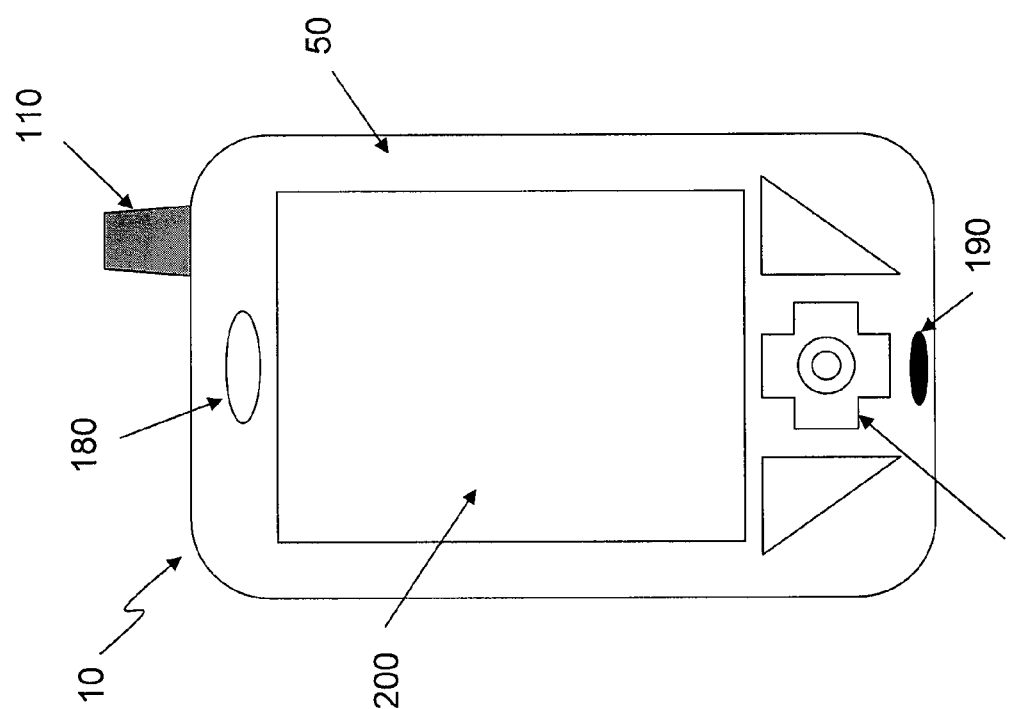
Fig. 2
Fig. 1

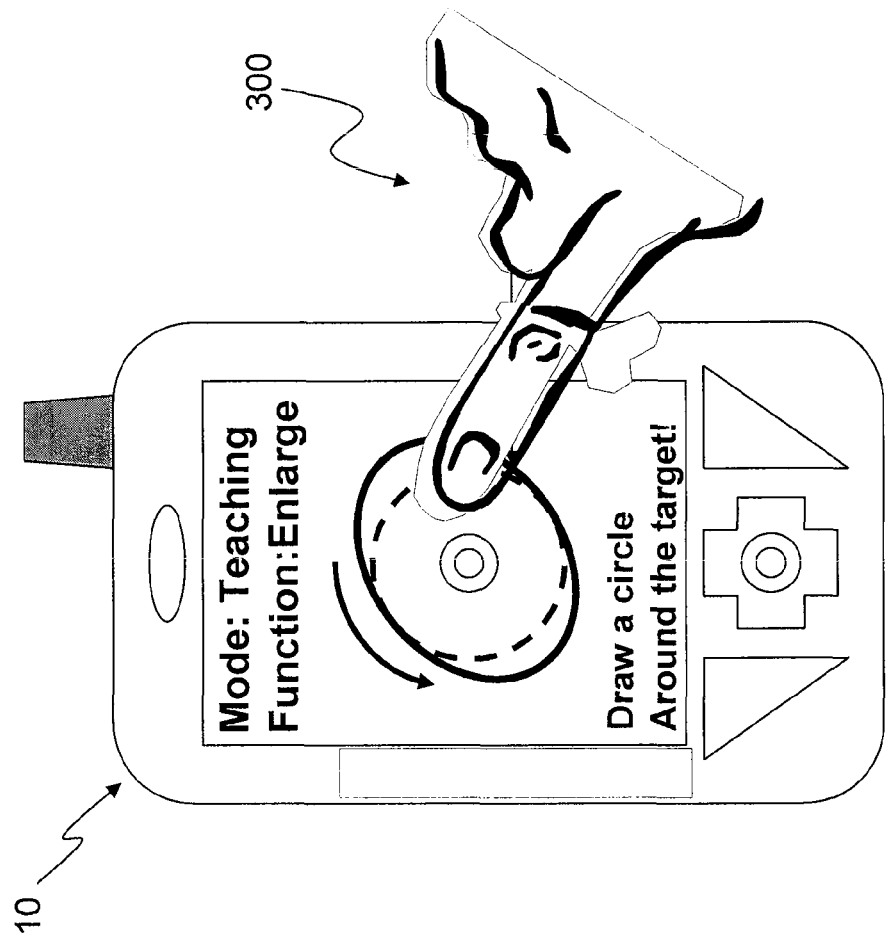
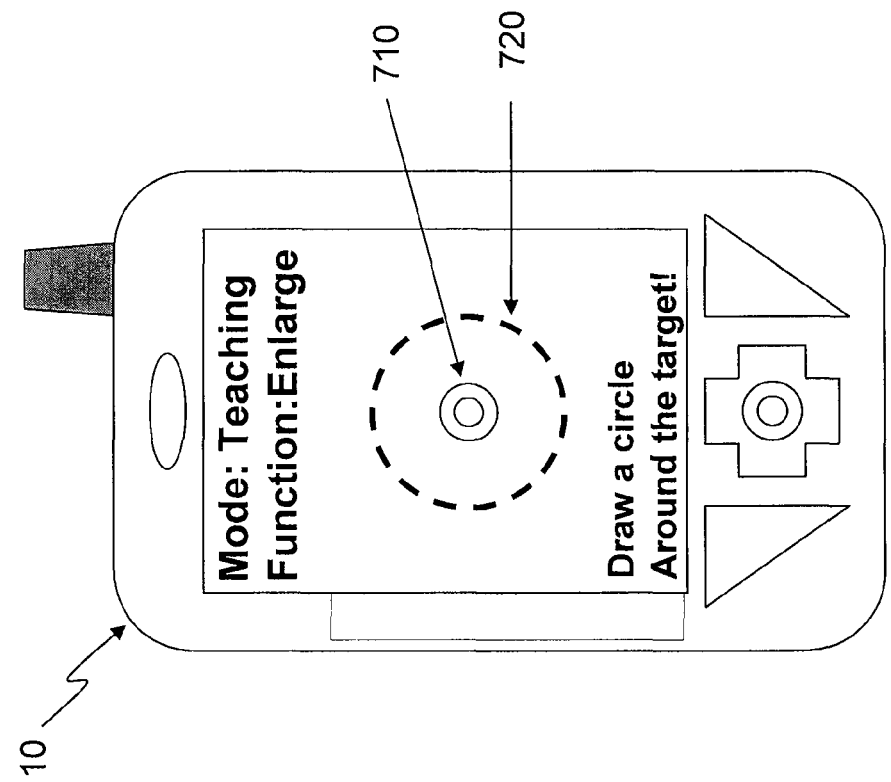
Fig. 8B
Fig. 8A

ELECTRONIC DEVICE HAVING A TOUCH PANEL DISPLAY AND A METHOD FOR OPERATING THE SAME

RELATED TECHNOLOGY FIELD

The present application relates to an electronic device having a touch panel display and the method for operating the same. Examples of the electronic device include a mobile terminal such as a cellular phone, a PDA (Personal Digital Assistance) and a mobile computer, which has a touch panel display for an input/output device.

BACKGROUND

Many of mobile terminals such as cellular phones, PDA's or mobile computers use a touch panel display as an input device for a user to input instructions or commands or data into the terminal. For example, the user can dial a phone number by touching numbers displayed on the touch panel display. Further, since the mobile terminals have a variety of functions other than a phone, the touch panel display has become a more important feature for the mobile terminals as an input device of the commands or instructions for the functions.

A lot of methods for operating the mobile terminal having a touch panel display for the user to input commands have been developed and reported. For example, U.S. Patent Publication Number US 2008/0165141 discloses various gestures for controlling, manipulating and editing of media files using touch sensitive devices. The gestures include tapping the display, spreading two fingers while simultaneously touching the display, sliding a finger on the display or drawing a circle on the display with the touch of a finger. These gestures are used to resize a window, scroll a display, rotate an object, zoom in/out of a displayed image, delete or insert text, etc.

One of the difficult commands to be input is zooming-in (enlarging) and zooming-out (shrinking) the displayed image on the display. In the above published patent application (US 2008/0165141), the gesture of spreading two fingers on the display is assigned to a zooming sequence. As illustrated by FIGS. 13A-13H of US 2008/0165141, when the user starts to spread the two fingers apart, the displayed map zooms in (enlarges).

One of the problems of this method is the user has to repeat the spreading gesture several times in order to get the desired size (magnification) of the map, because the fingers cannot be spread beyond the display. Apparently, when the user closes back the fingers together to shrink the map, the fingers cannot be closed anymore once they are closed. Accordingly, since the user has to repeat the spreading or closing gestures to get desired size of the map, it would take time to get a desired size of the map or other images. The method disclosed in US 2008/0165141 achieves only discrete and step-by-step zooming in/out of the displayed image, which is not a particularly intuitive method for zooming in/out the displayed image.

Another example of a conventional zooming-in/out function using a touch panel display is shown in a cellular phone model number HT-1100 for NTT Docomo in Japan manufactured by HTC Corporation in Taiwan. In the HT-1100 product, a user draws a circular figure in clockwise direction to zoom-in and in counter-clockwise to zoom-out. In this method, however, when the user draws one circular figure, then the image is enlarged or shrunk by one increment. Thus, the user has to draw another circle(s) if the magnification of the image is not sufficient. Similar to the method of US 2008/0165141, the HT-1100 product merely provides a discrete and step-by-step zooming in/out function of the displayed image, which is not an intuitive method for zooming in/out the displayed image.

Based on the above, there is a need for more intuitive method of inputting a zooming in/out command into a mobile terminal having a touch panel display.

SUMMARY

It is one objective of the present application to provide a more intuitive method using a finger gesture for zooming in/out of a displayed image on a touch panel display. For some examples, it may be yet another objective to provide easier and quicker navigation on the web pages, maps, photos or the like displayed on the touch panel display.

Accordingly, this application, for example, discloses a method for operating an electronic device having a touch panel display. The exemplary method includes displaying an image on the touch panel display and detecting curved motion of a user input device touching and moving on the touch panel display. The detected curved motion at least substantially encompasses a portion on the displayed image. The method also involves enlarging or shrinking the displayed image on the touch panel display from a perspective encompassing the portion of the displayed image. The enlarging or shrinking of the displayed image on the touch panel display continues during detection of the curved motion.

In other words, the method of operating an electronic device of the present application includes continuing enlarging or shrinking of the displayed image as long as the user continues drawing the curved motion and until the displayed image reaches the magnification that the user desires. When the image has become the desired magnification, the user may stop the drawing and release the finger from the touch panel display to get the image in the magnification. Thus, the user may get the exactly desired magnification of the image. Accordingly, the user may operate the electronic device in a more intuitive manner than the conventional devices which employ a discrete and step-by-step zooming method.

The image may be enlarged when the curved motion is clockwise (or counter-clockwise), and shrunk when the curved motion is counter-clockwise (clockwise). The user may select these directions. The curved motion may include motion drawing a substantially enclosed figure around the portion of the displayed image or a spiral pattern around the portion of the displayed image. The substantially enclosed figure may include a circle or an ellipsoid. The curved motion may include drawing a spiral pattern. The enlarging or shrinking on the touch panel display may be proportional to the length of the detected curved motion, proportional to the number of circles or ellipsoids around the portion of the displayed image or vary with speed of the curved motion. The rate of enlarging or shrinking the image displayed on the touch panel may vary with size of figure drawn by the curved motion or with content of the image. The electronic device may be a wireless phone, a PDA, a mobile terminal or a mobile computer.

This application also describes a calibration technique. This, for example, might involve displaying a test image on the touch panel display and displaying a function to be calibrated. The function is either enlarging or shrinking of a displayed image from a perspective encompassing the portion of the displayed image. The electronic device urges a user to draw a test curved motion on the touch panel display by using a user input device. The electronic device detects the test curved motion. The detected test curved motion at least substantially encompasses a portion on the test image. The method then involves storing the test curved motion as a calibrated motion for the function.

The step of detecting the curved motion may further include comparing the detected curved motion with the calibrated motion and deciding whether the detected curved motion substantially matches the calibrated motion and whether the detected curved motion is directed to enlarging or shrinking the displayed image. The step of enlarging or shrinking the displayed image further includes, when the detected curved motion substantially matches the calibrated motion, executing the enlarging or shrinking of the displayed image on the touch panel display.

This application also describes an electronic device having a touch panel display, comprising display control circuitry configured to display an image on the touch panel display, to detect curved motion of a user input device touching and moving on the touch panel display. The detected curved motion at least substantially encompasses a portion on the displayed image. In response, the display control circuitry enlarges or shrinks the displayed image on the touch panel display, from a perspective encompassing the portion of the displayed image. The display control circuitry is configured to continue enlarging or shrinking the displayed image on the touch panel display during detection of the curved motion.

This application further describes an article of manufacture comprising a machine readable storage medium; and programming instructions embodied in the medium for execution by a programmable controller of an electronic device. Execution of the programming instructions by the programmable controller causes the electronic device to perform functions comprising: (a) displaying an image on the touch panel display; (b) detecting curved motion of a user input device touching and moving on the touch panel display, the detected curved motion at least substantially encompassing a portion on the displayed image; and (c) enlarging or shrinking the displayed image on the touch panel display from a perspective encompassing the portion of the displayed image. The enlarging or shrinking of the displayed image on the touch panel display continues during detection of the curved motion.

In accordance with one example, since the displayed image continues to be enlarged or shrunk as long as a finger is drawing the curved motion, the user may continue drawing the curved motion until the displayed image becomes the desired size and stop the gesture when displayed image becomes the desired size, which is more intuitive than the conventional method. In accordance with another embodiment, the user may not necessarily continue drawing the curved motion. Instead, once zooming in/out has been started by initial drawing of the curved motion, the enlarging or shrinking on the touch panel display continues as long as the finger touches on the touch panel display.

In accordance with another example, the user may calibrate the electronic device by teaching it their way of drawing the curved motion. Accordingly, a more user friendly and easier electronic device having a touch panel display may be provided.

The invention itself, together with further objects and advantages, can be better understood by reference to the following detailed description and the accompanying drawings.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 1 is an exemplary schematic view of an electronic device having a touch panel display.

FIG. 2 is an exemplary block diagram of an electronic device having a touch panel display.

FIGS. 8A-8B are illustrations of calibration of the operation of the zooming function.

DETAILED DESCRIPTION

Figure 3B:
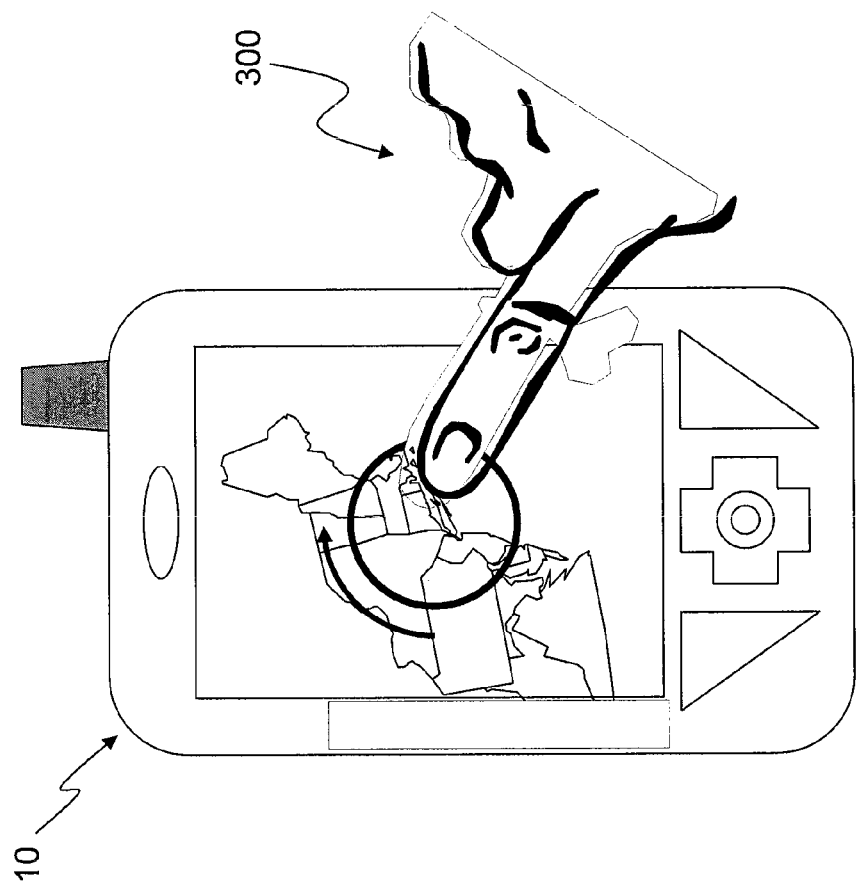
FIGS. 3A-3D are illustrations of a zooming function.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

One example according to this application is a method for operating an electronic device having a touch panel display to provide a more intuitive method using a finger gesture for zooming in/out of a displayed image on a touch panel display. The method includes displaying an image on the touch panel display and detecting curved motion of a user input device touching and moving on the touch panel display. The detected curved motion at least substantially encompasses a portion on the displayed image. The method also involves enlarging or shrinking the displayed image on the touch panel display from a perspective encompassing the portion of the displayed image. The enlarging or shrinking of the displayed image on the touch panel display continues during detection of the curved motion, i.e., as long as long as the user continues drawing the curved motion and until the image becomes what the user desires.

In another example according to this application, the enlarging or shrinking of the displayed image on the touch panel display continues during detection of the input device touching on the touch panel display, i.e., as long as long as the user input device touches the touch panel display after drawing the curved motion.

Another example according to this application is a calibration technique. This involves displaying a test image on the touch panel display and displaying a function to be calibrated. The function is either enlarging or shrinking of a displayed image from a perspective encompassing the portion of the displayed image. The electronic device urges a user to draw a test curved motion on the touch panel display by using a user input device. The electronic device detects the test curved motion. The detected test curved motion at least substantially encompasses a portion on the test image. The method then involves storing the test curved motion as a calibrated motion for the function.

Yet another example according to this application is an electronic device having a touch panel display, comprising display control circuitry configured to display an image on the touch panel display, to detect curved motion of a user input device touching and moving on the touch panel display, the detected curved motion at least substantially encompassing a portion on the displayed image, and to enlarge or shrink the displayed image on the touch panel display from a perspective encompassing the portion of the displayed image. The display control circuitry is configured to continue enlarging or shrinking the displayed image on the touch panel display during detection of the curved motion.

First Example

FIG. 1 shows an example of an electronic device having a touch panel display, for purpose of discussion of a first embodiment of the present application. The electronic device 10, for example, a cellular phone, comprises a main body 50, input keys 100, antenna 110, a speaker 180, a microphone 190 and a touch panel display 200. The configuration of these elements is not limited to the arrangement shown in FIG. 1.

FIG. 2 shows an exemplary block diagram of elements of the electronic device 10 of FIG. 1. The electronic device 10, for example, a cellular phone, comprises an RF interface 120 connected to the antenna 110, an analog base band processor 130 and a digital base band processor 140 connected to a processor 150. A display controller or driver 210 is connected to the touch panel display 200 and the processor 150 for controlling the touch panel display 200. An analog front end processor 170 is connected to the processor 150 for controlling the speaker 180 and the microphone 190. The processor 150 in configured to control the display controller 210, RF circuits (120, 130 and 140) and the analog front end processor. The processor 150 also connects to memories 150. The memories 160, for example, may comprise a RAM, a ROM or a flash memory.

In this embodiment, the touch panel display 210 is controlled by the display controller 210. However, the display controller may be included in the touch panel display 210 or in the processor 150, and may include or utilize any of a variety of types of any circuitries configured to control the particular type of touch panel display 200. In response to the information to be displayed, from the processor 150, the display controller 210 drives the touch panel display 200 to display the information as an image on the screen. The touch panel 200 indicates when it detects contacting of the screen by a user input device, such as the user's finger or a stylus pen, as well as the point of contact. The display controller 210 processes the indication of contact from the panel 200 and informs the processor 150.

Figure 3A:
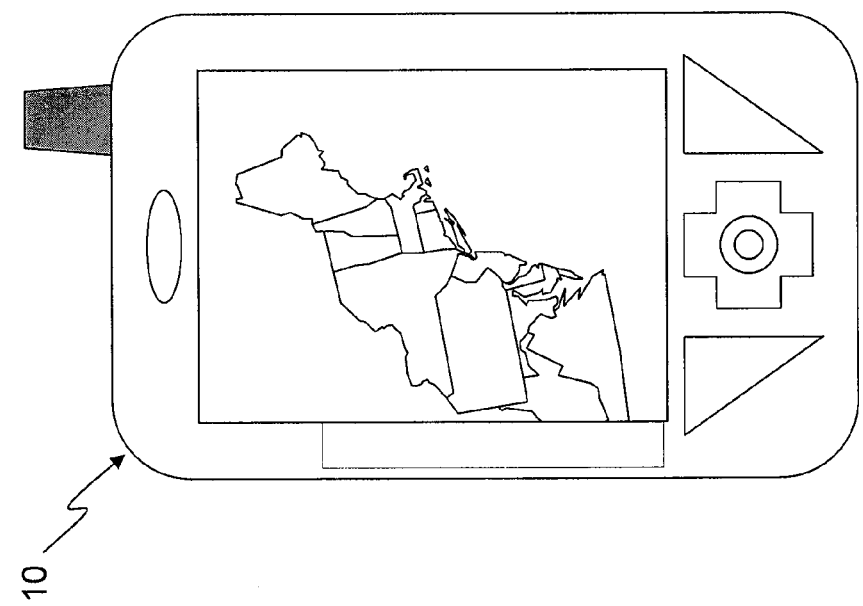
Figure 3D:
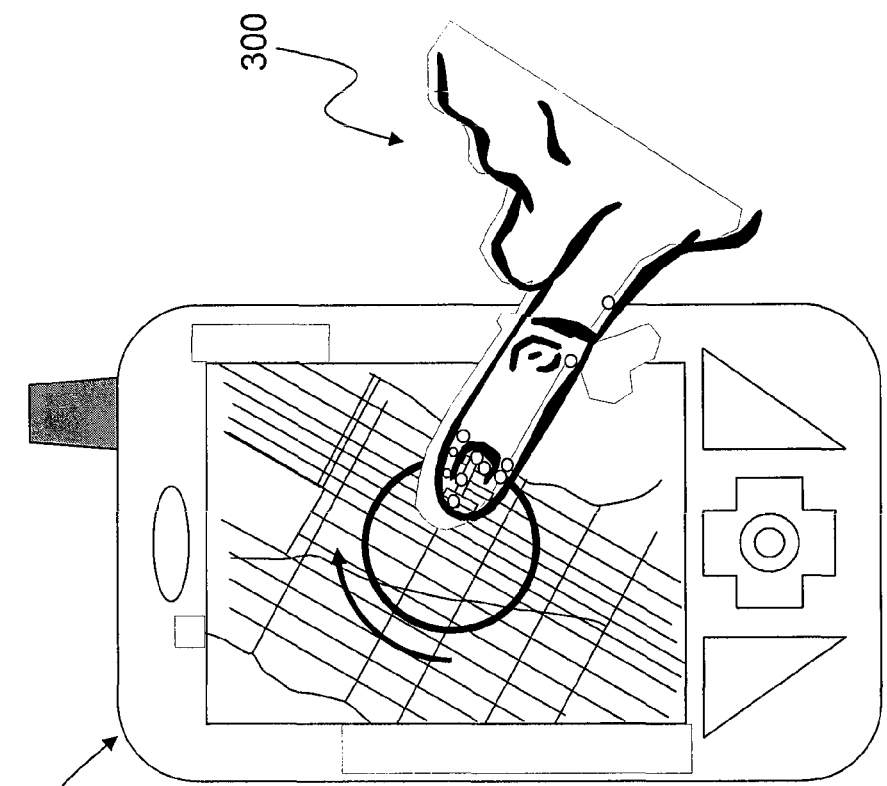

An operation of the zooming-in (enlarging) function in accordance with the embodiment is explained by reference to FIGS. 3A-3D and FIG. 4. As shown in FIG. 3A, an image, for example a map of the State of New York, is displayed on the touch panel display 200 (Step 410 of FIG. 4). Assume that a user using the electronic device 10 desires to enlarge the map to see the street map of New York City. The user touches by an input device 300, for example, her finger or a stylus pen, the touch panel display 200 to input a zoom-in command. In this embodiment, drawing clockwise circles is assigned to a zoom-in command. When the user touches the touch panel display 200, the touch panel display 200 detects the touching and motion of the finger (Step 420). The user draws curved motion at least substantially encompassing a portion of the map where the user desires to enlarge (FIG. 3B). In this embodiment, the user may draw a circle or circles encompassing New York City area in the clockwise direction.

The electronic device then decides whether the motion is a predetermined curved motion, i.e., clockwise circle(s), or not (step 430). In order for the electronic device 10 to decide whether the motion is the predetermined curved motion (i.e., a circle), it is not necessary if the curved motion is a perfect circle. For example, when the electronic device 10 detects a part (¼, ⅓, ½, ⅔ or ¾) of a circle, the device 10 may decide the curved motion is drawn. If the motion is not the curved motion and is assigned to other functions, the electronic device operates such functions other than zoom-in.

Figure 3C:
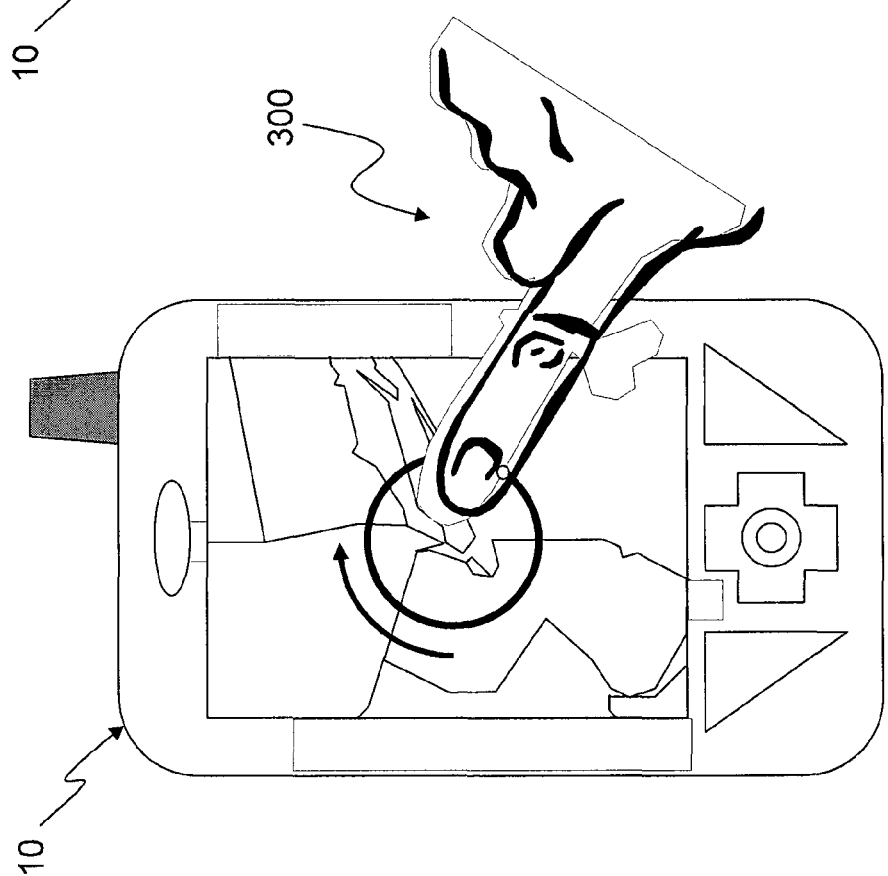
Figure 4:
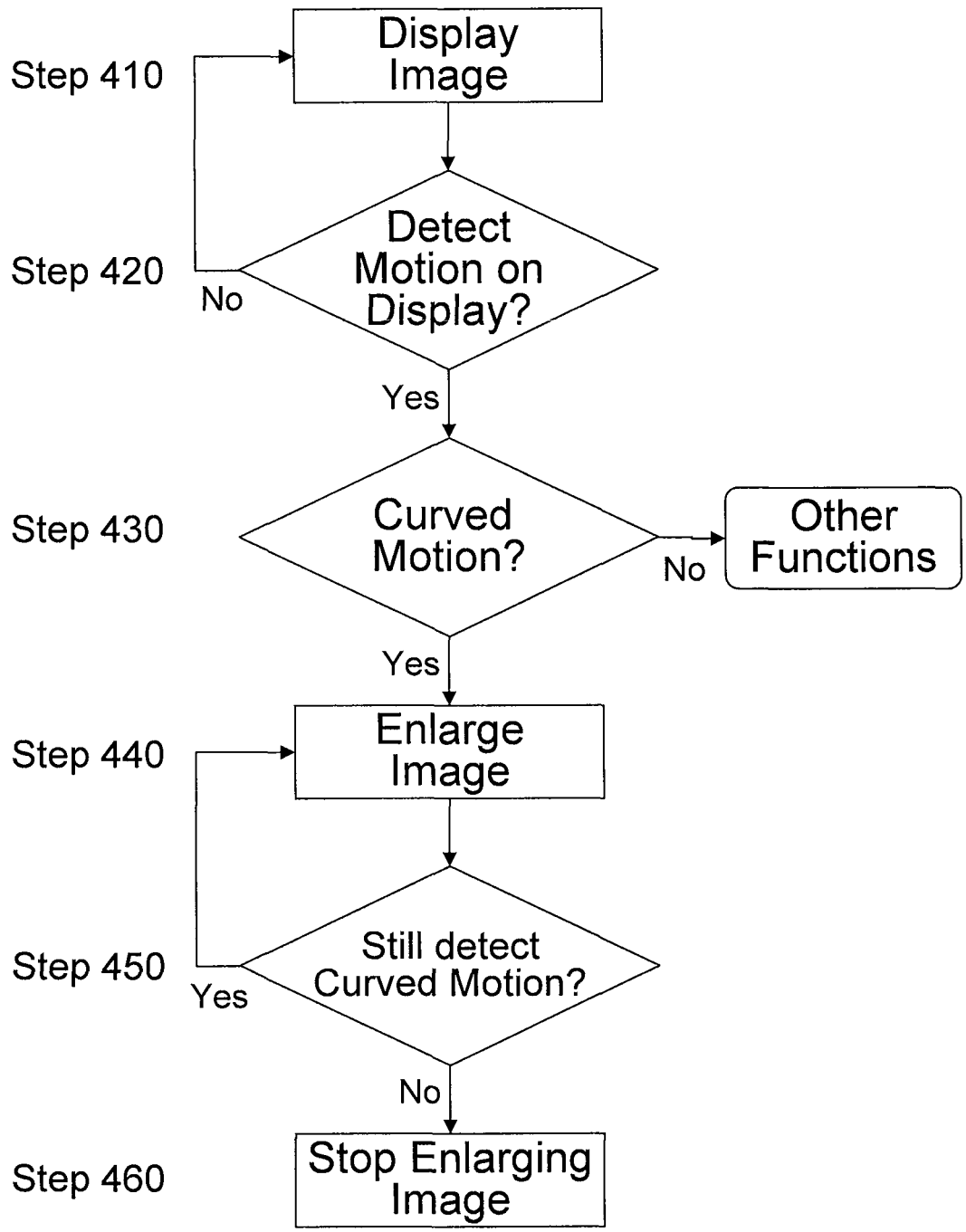
FIG. 4 is a flow chart showing operation of the zooming function.

If the electronic device 10 decides the motion is the predetermined curved motion, the map is enlarged (FIG. 3C and Step 440). In this embodiment, the electronic device 10 may enlarge the map until New York City and a part of New Jersey is displayed (FIG. 3C). However, since the user desires to see the street map of New York City, the user continues drawing the circles. As long as the electronic device 10 detects the drawing of circles, the device keeps enlarging the map (Step 450). When the street map is displayed in the magnification that the user desires (FIG. 3D), the user stops drawing the circles and removes her finger or stylus pen 300 from the touch panel display 200. Then, the electronic device 10 stops enlarging the map upon detecting the end of drawing the circles (Step 460).

When zooming-in, the electronic device 10 may enlarge the area encompassed by the detected curved motion. For example, if the curved motion includes the area encompassing the whole New York City, the electronic device displays the New York City area.

In reverse, if the user desires to see the map of the State of New York again, the user touches the touch panel display with her finger or the stylus pen and draws curved motion. To shrink the map, the user draws, for example, a circle or circles in the counter-clockwise direction in this example. The user may continue drawing the counter-clockwise circles until the electronic device 10 displays the map of the State of New York in the desired magnification.

In this embodiment, drawing clockwise circle(s) is assigned to the function of enlarging the displayed image and drawing counter-clockwise circles is assigned to the function of shrinking the displayed image. However, drawing clockwise circles may be assigned to the function of shrinking the displayed image and drawing counter-clockwise circles is assigned to the function of enlarging the displayed image. These assignments may be predetermined or selectable by the user by means of software included in the electronic device 10.

Figure 5B:
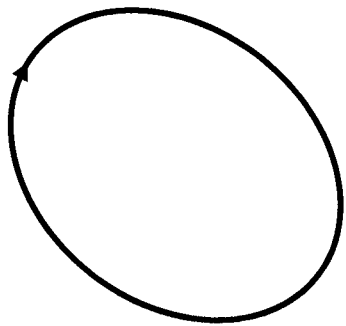
FIGS. 5A-5D illustrate examples of the curved motion.
Figure 5D:
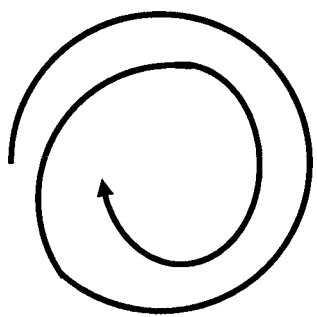
Figure 5A:
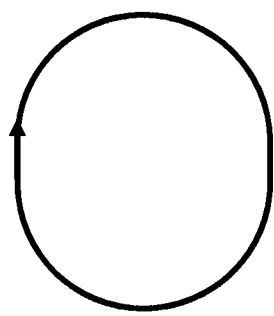
Figure 5C:
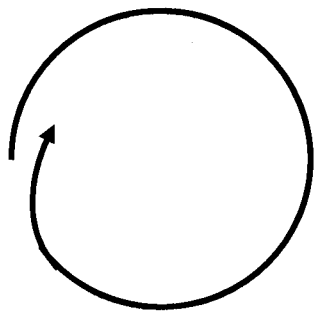

In this embodiment, the curved motion is drawing a circle or circles in either clockwise or counter-clockwise. The curved motion may not necessarily be a perfect circle. When the curved motion at least substantially encompasses a portion on the displayed image, the electronic device decides that curved motion is drawn. As shown in FIG. 5A or 5B, an oval or an ellipsoid may be included. The curved motion may further include a substantially enclosed figure around the portion of the displayed image as shown in FIG. 5C. The curved motion my include drawing a spiral pattern around the portion of the displayed image as shown in FIG. 5D.

The enlarging or shrinking on the touch panel display may be proportional to the number of circles or ellipsoids around the portion of the displayed image. For example, when the electronic device 10 detects two circles drawn on the touch panel display, the image is enlarged one increment. Of course, the electronic device may enlarge the image one increment every time when it detects, for example, ¼, ⅓ or ½ of a circle. It is noted that since the user continues drawing circles, the electronic device does not provide discrete or step-by-step zooming.

The rate or speed of enlarging or shrinking the image displayed on the touch panel may vary with the drawing speed of the curved motion. For example, when the user draws the curved motion faster, the electronic device enlarges the image faster, i.e., enlarges the image with large increment. When the user slows down drawing the curved motion, the electronic device enlarges the image slower, i.e., enlarges the image with smaller increment. Thus, when the enlarged image comes to the desired magnification, the user can slow down the drawing speed so as to get the exactly desired magnification of the image. Accordingly, the electronic device according to this embodiment provides more precise operation of enlarging or shrinking the image.

The rate of enlarging or shrinking the image displayed on the touch panel may vary with the size of figure drawn by the curved motion. For example, when the user draws a large circle, the electronic device may enlarge the image faster, i.e., enlarge the image with large increment. When the user draws a small circle, the electronic device would enlarge the image slower, i.e., enlarge the image with smaller increment. With this approach, when the enlarged image comes to the desired magnification, the user can draw smaller circles so as to get the exact desired magnification of the image. Accordingly, the electronic device according to this embodiment provides more precise operation of enlarging or shrinking the image.

As another alternative, the rate of enlarging or shrinking the image displayed on the touch panel may also vary with content of the image. For example, when the electronic device 10 displays a map of state level, the electronic device enlarges the image faster. When the electronic device 10 displays a map of street level, the electronic device enlarges the image slower. Thus, when the enlarged image comes to the desired magnification, the user may easily adjust the magnification of the image so as to get the exact desired magnification of the image. In another example, when the electronic device displays a map, the electronic device enlarges the image faster. When the electronic device 10 displays a photo image, the electronic device 10 enlarges the image slower, because the user usually does not desire to enlarge the photo image so large. Accordingly, the electronic device according to this embodiment provides more precise operation of enlarging or shrinking the image.

It is noted that these methods set forth above may be implemented by software stored in the memories 160 or by hardware comprising, for example, the display device 20 and the processor 150, or the combination of software and hardware.

In the examples discussed so far, the image displayed on the touch panel display 200 of the electronic device 10 is continued to be enlarged or shrunk during the continuing detection of the curved motion. The conventional device provides discrete and step-by-step changes in the magnification of the image. In contrast, the electronic device 10 according to the above-discussed implementation (FIGS. 3-5B) provides continuous and dynamic changes in the magnification of the image. Thus, the user can operate the electronic device more intuitive manner than the conventional device.

Second Example

FIGS. 6A-6D and FIG. 7 show the second embodiment of the present application. The configuration and the circuitry of the electronic device 10 in accordance with the second embodiment are substantially the same as the electronic device of the first embodiment. However, the gesture-responsive operations are somewhat different.

Figure 6B:
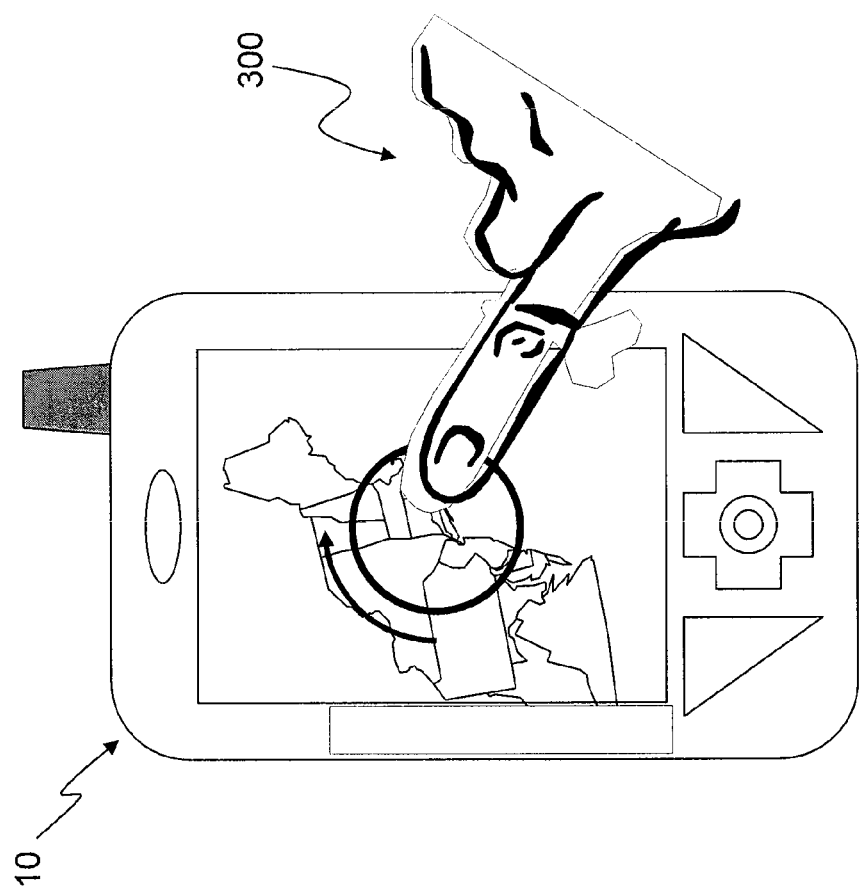
FIGS. 6A-6D are illustrations of a variation of the zooming function.
Figure 6A:
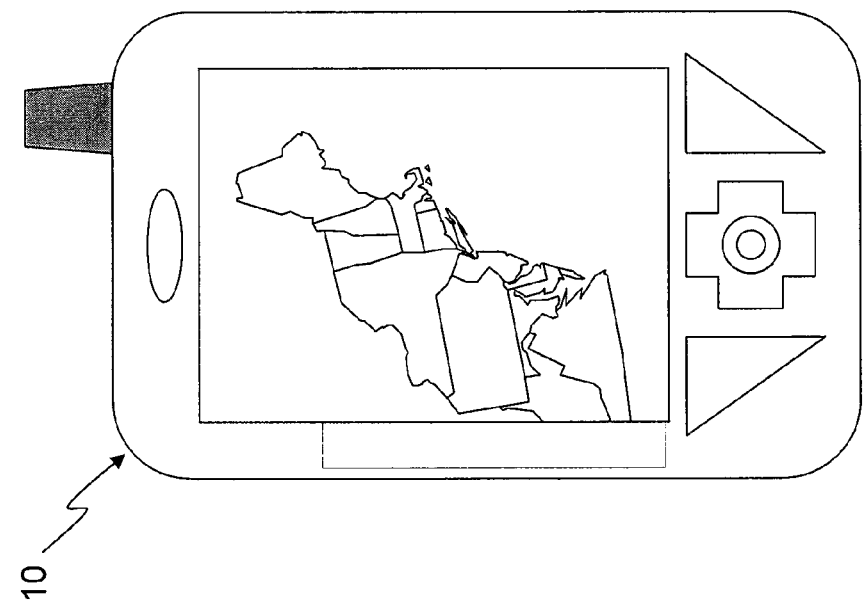
Figure 6D:
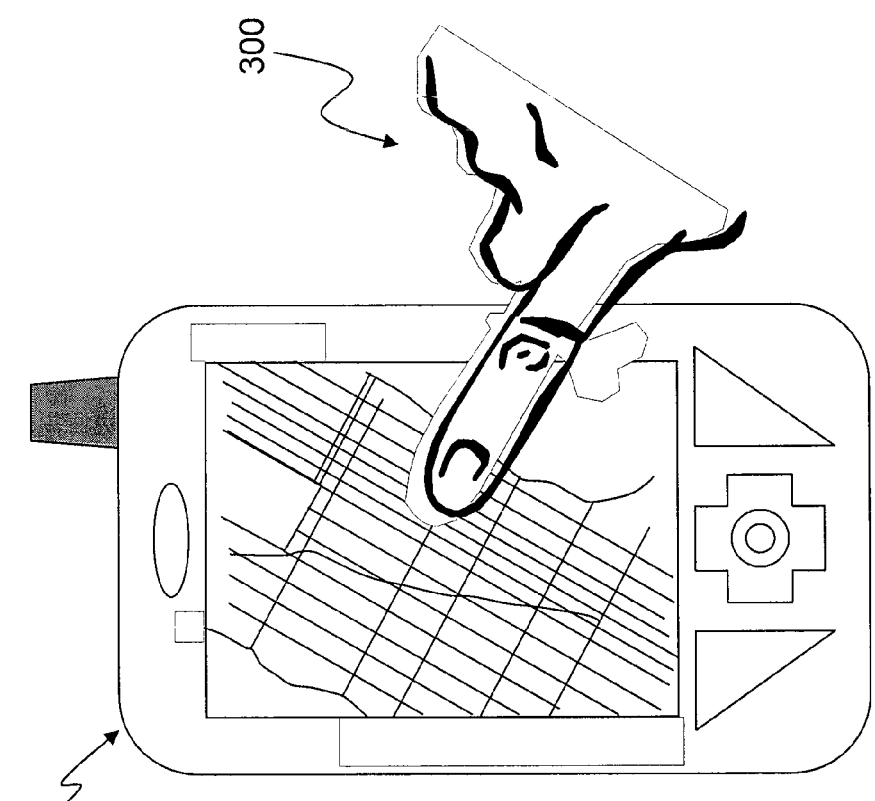
Figure 7:
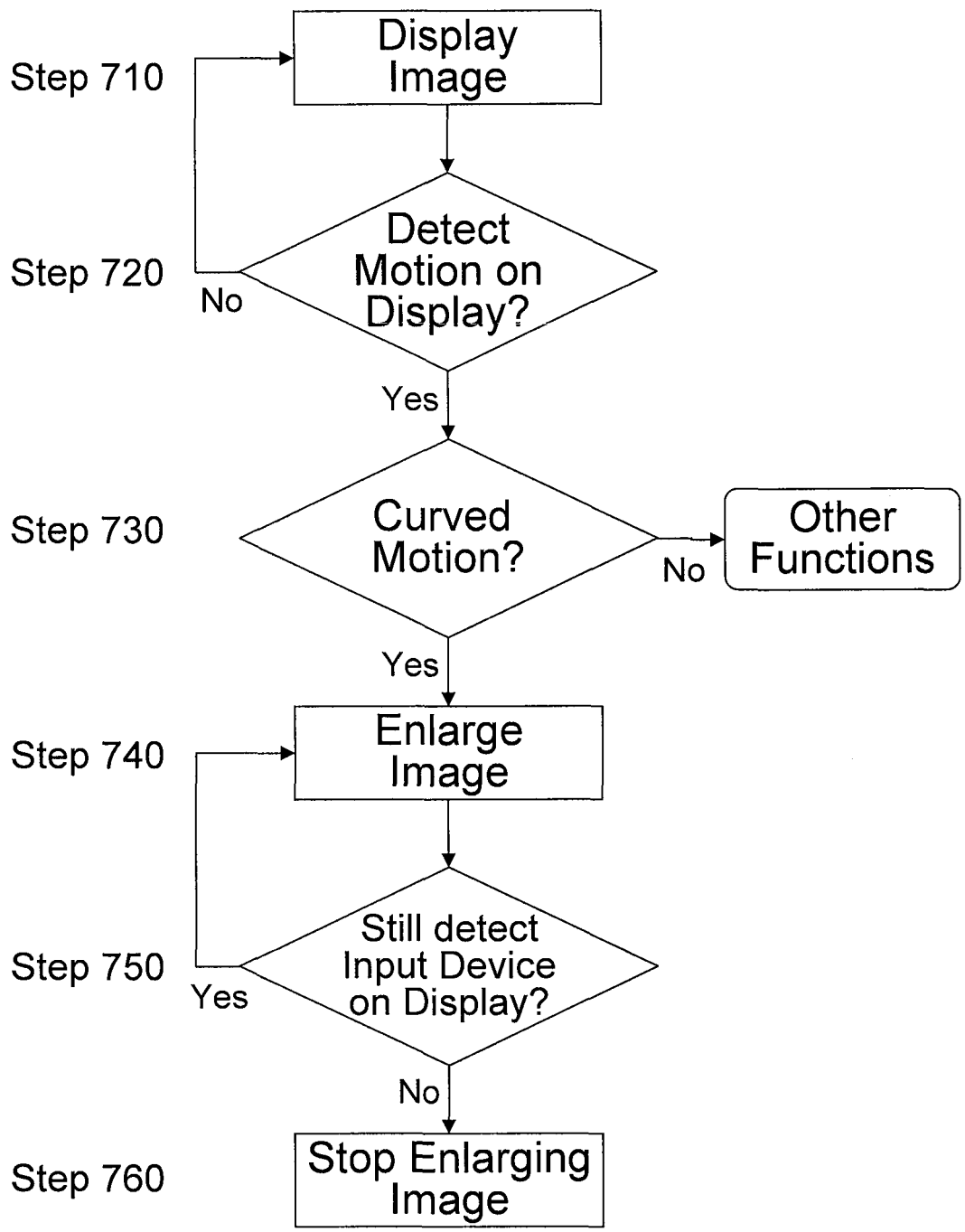
FIG. 7 is a flow chart showing operation of the variation of the zooming function.

For purpose of discussing a particular example, similar to the first embodiment, a map of the State of New York is displayed on the touch panel display 200 as shown in FIG. 6A (Step 710 of FIG. 7). Then, the user draws curved motion, for example, a circle or circles, to enlarge the map; and the electronic device 10 detects such motion (Steps 720-730). If the electronic device 10 decides the drawn curved motion substantially corresponds to the predetermined motion, the electronic device starts enlarging the map as shown in FIG. 6B (Step 740).

Figure 6C:
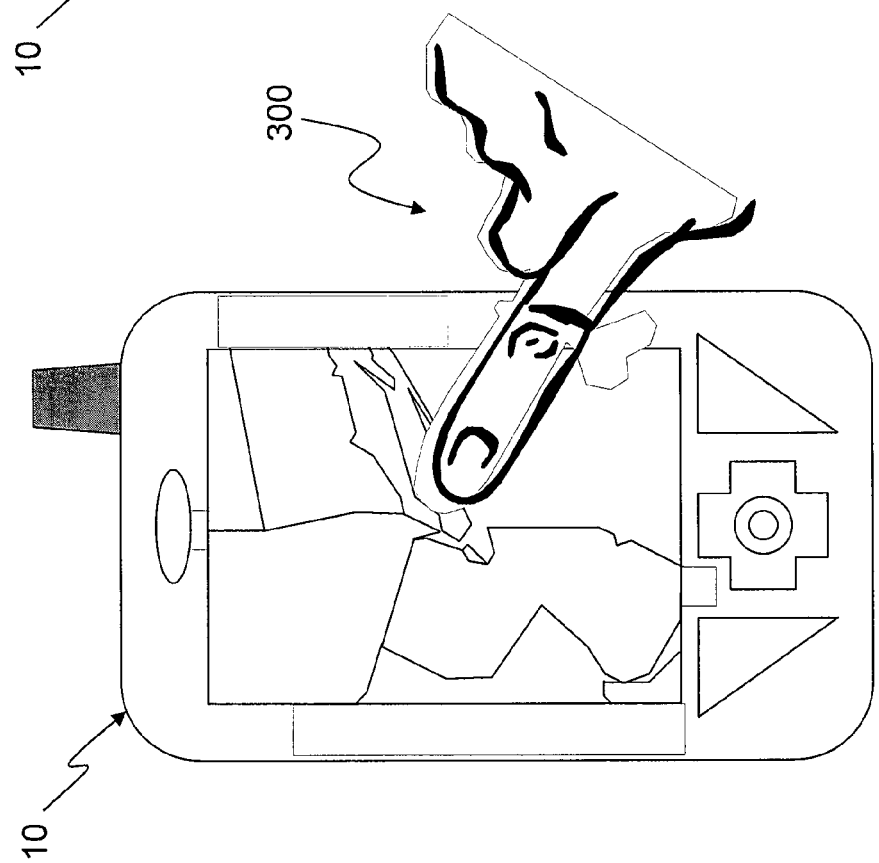

In the second Embodiment, the user is not required to continue drawing the circles to continue enlarging the map. Instead, after drawing a sufficient curve to permit detection and location on the display, the user keeps touching her finger or the stylus pen, by which the user initially drew the circles, on the touch panel display. The electronic device continues enlarging the map as long as it detects the finger or the stylus pen on the touch panel display 200 as shown in FIG. 6C (Steps 740-750). When the street map is displayed in the magnification that the user desires (FIG. 6D), the user removes her finger or the stylus pen 300 from the touch panel display 200. Then, the electronic device 10 stops enlarging the map upon detecting the leaving of the input device 300 (Step 760).

In this embodiment, the image displayed on the touch panel display of the electronic device 10 is continued to be enlarged or shrunk during the detection of touching by the input device. The conventional device provides discrete and step-by-step changes in the magnification of the image. In contrast, the electronic device 10 according to the present example provides continuous and dynamic changes in the magnification of the image. Thus, the user can operate the electronic device a more intuitive manner than the conventional device.

Third Example

Figure 9:
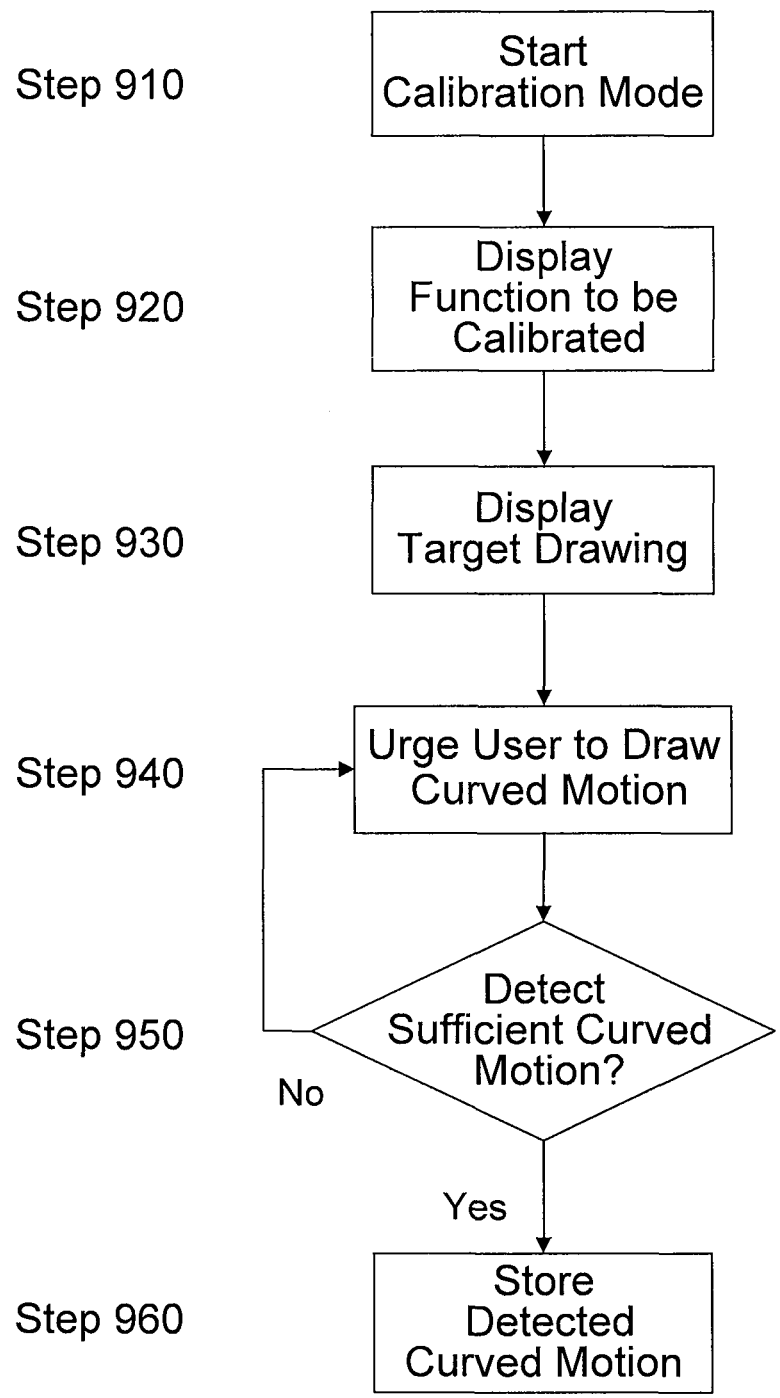
FIG. 9 is a flow chart showing operation of the calibrating the electronic device.

FIGS. 8A-8B and FIG. 9 show a third embodiment by way of example. The configuration and the circuitry of the electronic device 10 in accordance with the third embodiment are substantially the same as the electronic device of the first embodiment or the second embodiment. The feature of the third embodiment is calibrating or teaching the user's specific curved motion to the electronic device. When the drawing made by the user is different from other users because of the users' habit or mannerism, or the user desires to use a specific curved motion of her own for the enlarging or shrinking function, the electronic device according to the third embodiment enables the user to teach the device according to her tastes.

First, a user, who desires to calibrate the electronic device 10, selects the teaching mode. The electronic device 10 displays that the mode has been changed to the teaching mode (Step 910 of FIG. 9). Then, the user selects the function that she desires to teach her own curved motion to the electronic device 10 (Step 920). In this embodiment, for example, the enlarging (zooming in) function is selected (FIG. 8A). Then, the electronic device 10 displays a target circle 720 around the center mark 710 and urges the user to draw her own curved motion (FIG. 8A, Steps 930-940).

Then, the user draws curved motion as shown in FIG. 8B. In this embodiment, the user may draw slanting ovals in counter-clockwise around the center mark 710 as her own curve motion for the enlarging function. The electronic device 10 detects the motion (Step 950). If the electronic device 10 fails to detect curved motion, the device 10 urges the user to draw the curved motion again (Steps 950-940). If the electronic device 10 detects sufficient curved motion, it stores the detected motion as the user's curved motion with its direction for the enlarging function. Here, the electronic device 10 may average the drawn ovals and store one oval as the user's curved motion.

After teaching or training of the device, the user, for example, selects to display a map or the like on the touch panel display and desires to enlarge the map to see a street map as describe in the earlier example. The user draws her own curved motion, i.e., slanting ovals in counter-clockwise, around the place she desires to enlarge. The electronic device 10 detects the curved motion and compares the detected curved motion with the stored motion. If the detected motion substantially corresponds to the stored motion, the electronic device 10 enlarges the map during the detection of the drawing of slanting ovals. When the electronic device 10 detects a part (¼, ⅓, ½, ⅔ or ¾) of the slanting oval, the device 10 may compare the drawing with the stored motion and decide the curved motion was drawn.

The conventional electronic device having a touch panel display requires that the user draw the substantially same figure as the predetermined figure, which the user sometimes fails to accomplish because of her habit or mannerism of the drawing; and as a result she feels frustration. In contrast, since the electronic device of the present embodiment is configured to be calibrated by the user's teaching her own curved motion to her device, the electronic device does not fail to detect the curved motion drawn by the user because of the users' habit or mannerism of the drawing. Further, since the user may teach her own curved motion to the electronic device, it is less likely that she is frustrated by failing in inputting of a command when using a touch panel display for input. Thus, the user can operate the electronic device in a more intuitive manner than the conventional device.

The present teachings offer numerous advantages over prior art electronic devices. Most importantly, the examples provide continuous enlarging or shrinking of the displayed image so that a user can input commands into the electronic device in a more intuitive manner. Another advantage is that the device provides more precise enlarging or shrinking operation.

Yet another advantage is that the electronic device may offer a customized electronic device having a touch panel display as in the example of FIGS. 8A-9. Regardless of the user's habit or mannerism, the electronic device provides reliable input method for enlarging or shrinking the image using the touch panel display.

As shown by the discussion above, a number of aspects of the zoom control functions of the electronic device rely on programming of the device. Program aspects of the technology may be thought of as products or articles of manufacture, typically in the form of executable code and/or associated data that is carried on or embodied in a type of machine readable medium, for execution by a mobile terminal or other electronic device having the touch panel display.

Storage media include any or all of the memory of the mobile terminals, PDAs, computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another, for example, from a management server or host computer of the network operator or affiliate into one or more devices such as mobile terminals of the type shown in FIGS. 1 and 2. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to storage media, terms such as computer or machine "readable medium" refer to any medium that participates in providing instructions to a processor for execution.

Hence, a machine readable medium may take many forms, including but not limited to, a tangible storage medium, a carrier wave medium or a physical transmission medium. Non-volatile storage media include, for example, optical or magnetic disks, such as any of the storage devices in mobile terminals shown in the drawings in other electronic devices or in any computer(s) or the like that may be used to supply such programming to the electronic devices for installation and/or upgrade purposes. Volatile storage media include dynamic memory, such as main memory of such a computer platform or of any of the electronic devices. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer or machine readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM, an EPROM and an EEPROM, a FLASH-EPROM, any other memory chip or cartridge, a carrier wave transporting data or instructions, cables or links transporting such a carrier wave, or any other medium from which a computer or other machine can read programming code and/or data. Many of these forms of computer readable media may be involved in carrying one or more sequences of one or more coded instructions to a processor for execution for example in a mobile terminal and other electronic device that includes the touch panel display.

Although certain specific embodiments of the present invention have been disclosed, it is noted that the teachings discussed above may be embodied in other forms without departing from the spirit or essential characteristics thereof. Thus, the present embodiments are therefore to be considered in all respects as illustrative and not restrictive, the scope of invention being indicated by the appended claims, and all changes that come within the meaning and range of equivalency of the claims are therefore intended to be embraced therein.

What is claimed is:

1. A method comprising:
    displaying, by an electronic device, a target image representing a target curved motion, on a touch panel display of the electronic device;
    displaying a function, the function being either enlarging or shrinking of an image;
    requesting, by the electronic device, a test curved motion, corresponding to the displayed target image, to be drawn on the target image on the touch panel display;
    in response to the request, detecting completion of drawing of the test curved motion;
    assigning the detected test curved motion as a predetermined curved motion;
    displaying the image on the touch panel display of the electronic device;

detecting a partial curved motion, that is less than a complete curved motion, of an object touching on the touch panel display;

determining whether the partial curved motion substantially matches a portion of the predetermined curved motion; and in response to determining that the partial curved motion substantially matches the portion of the predetermined curved motion, enlarging or shrinking the displayed image on the touch panel display continuously, immediately after detecting the partial curved motion and continuing while the touching on the touch panel display by the object continues to be detected.

2. The method of claim 1, further comprising providing on the touch panel display a display that permits user selection of directionality to enlarge or shrink images on the touch panel display.

3. The method of claim 2, wherein based on user selection of the directionality to enlarge or shrink images on the touch panel display:

the displayed image is continuously enlarged when the curved motion is counter-clockwise, and the displayed image is continuously shrunk when the curved motion is clockwise, or the displayed image is continuously enlarged when the curved motion is clockwise, and the displayed image is continuously shrunk when the curved motion is counter-clockwise.

4. The method of claim 1, wherein the test curved motion includes motion drawing a substantially enclosed figure around a portion of the displayed target image.

5. The method of claim 4, wherein the test curved motion is drawing a circle or an ellipsoid around the portion of the displayed target image.

6. The method of claim 1, wherein the test curved motion is drawing a spiral pattern around a portion of the displayed target image.

7. The method of claim 1, wherein a rate of the enlarging or shrinking of the displayed image on the touch panel display varies with speed of the detected partial curved motion.

8. The method of claim 1, wherein a rate of the enlarging or shrinking of the displayed image on the touch panel display varies with size of a figure drawn by the partial curved motion.

9. The method of claim 1, wherein a rate of the enlarging or shrinking of the displayed image on the touch panel display varies as a function of content of the image displayed on the touch panel.

10. A method comprising:

displaying, by an electronic device, a target image representing a target curved motion, on a touch panel display of the electronic device;

displaying a function to be calibrated, the function being either enlarging or shrinking of a displayed image;

requesting a test curved motion to be drawn on the target image on the touch panel display at least substantially encircling an area of the target image one or more times to teach the test curved motion to the electronic device;

detecting drawing of the test curved motion;

storing the detected test curved motion being taught as a calibrated motion for the function, wherein the detected test curved motion at least substantially encircles an area and is permitted to be a figure that encircles essentially the same area multiple times;

detecting a curved motion of an object moving on the touch panel display, the detecting the curved motion comprising:

comparing the detected curved motion with the calibrated motion; and deciding whether the detected curved motion substantially matches the calibrated motion and whether the detected curved motion is directed to enlarging or shrinking the displayed image; and immediately after deciding that the detected curved motion substantially matches the calibrated motion, executing the enlarging or shrinking of the displayed image on the touch panel display.

11. A method comprising:

displaying, by an electronic device, a target representing a target curved motion, on a touch panel display of the electronic device;

displaying a function, the function being either enlarging or shrinking of an image;

requesting, by the electronic device, a test curved motion, corresponding to the displayed target image, to be drawn on the target image on the touch panel display;

in response to the request, detecting completion of drawing of the test curved motion;

assigning the detected test curved motion as a predetermined curved motion;

displaying the image on the touch panel display of the electronic device;

detecting a partial curved motion of an object touching and moving on the touch panel display;

determining whether the partial curved motion substantially matches a portion of the predetermined curved motion; and upon determination that the partial curved motion substantially matches the portion of the predetermined curved motion, continuously enlarging or shrinking the image displayed on the touch panel display, wherein the enlarging or shrinking on the touch panel display begins immediately after detecting the partial curved motion, and continuing to enlarge or shrink the displayed image after the curved motion, that is more than the partial curved motion, is no longer detected so long as detection of the object contacting the touch panel display continues.

12. An electronic device comprising:

a touch panel display; and display control circuitry configured to:

display, by the electronic device, a target image that represents a target curved motion, on the touch panel display;

display a function, the function being either enlarging or shrinking of an image;

request a test curved motion, corresponding to the target image, to be drawn on the target image on the touch panel display;

detect completion of drawing of the test curved motion;

assign the detected test curved motion as a predetermined curved motion;

display the image on the touch panel display, detect a partial curved motion, that is less than a complete curved motion, of an object touching on the touch panel display, determine whether the partial curved motion substantially matches a portion of the predetermined curved motion; and in response to determining that the partial curved motion substantially matches the portion of the predetermined curved motion, continuously enlarge or shrink the displayed image on the touch panel display, immediately after detecting the partial curved motion, and continuing while the touching on the touch panel display by the object continues to be detected.

13. The electronic device of claim 12, wherein the display control circuitry is further configured to provide on the touch panel display a display that permits user selection of directionality to enlarge or shrink images on the touch panel display.

14. The electronic device of claim 13, wherein, based on user selection of the directionality, to enlarge or shrink images on the touch panel display, the circuitry is further configured to:
   continuously enlarge the displayed image when the partial curved motion is counter-clockwise, and to continuously shrink the displayed image when the partial curved motion is clockwise; or continuously enlarge the displayed image when the partial curved motion is clockwise, and to continuously shrink the displayed image when the partial curved motion is counter-clockwise.

15. The electronic device of claim 12, wherein a rate of the enlarging or shrinking the image displayed on the touch panel display varies with speed of the partial curved motion.

16. The electronic device of claim 12, wherein a rate of the enlarging or shrinking the image displayed on the touch panel display varies with size of a figure drawn by the partial curved motion.

17. The electronic device of claim 12, wherein a rate of the enlarging or shrinking the image displayed on the touch panel display varies as a function of content of the image displayed on the touch panel.

18. An article of manufacture, comprising:
   a non-transitory machine readable storage medium; and
   programming instructions embodied in the medium for execution by a programmable controller of an electronic device, wherein execution of the programming instructions by the programmable controller causes the electronic device to perform functions comprising functions to:
   (a) display, by the electronic device, a target image that represents a target curved motion, on a touch panel display of the electronic device;
   (b) display a function, the function being either enlarging or shrinking of an image;
   (c) request a test curved motion, corresponding to the displayed target image, to be drawn on the target image on the touch panel display;
   (d) in response, detect completion of drawing of the test curved motion;
   (e) assign the detected test curved motion as a predetermined curved motion;
   (f) display an image on a touch panel display of the electronic device;
   (g) detect a partial curved motion, that is less than a complete curved motion, of an object touching on the touch panel display;
   (h) determine whether the partial curved motion substantially matches a portion of the predetermined curved motion; and
   (i) in response to determining that the partial curved motion substantially matches the portion of the predetermined curved motion, continuously enlarge or shrink the displayed image on the touch panel display, immediately after detecting the partial curved motion and continuing while the touching on the touch panel display by the object continues to be detected.

19. The article of manufacture of claim 18, wherein the execution of the programming instructions by the programmable controller further causes the electronic device to provide on the touch panel display a display that permits user selection of directionality to enlarge or shrink images on the touch panel display.

20. The article of manufacture of claim 19, wherein the execution of the programming instructions by the programmable controller further causes the electronic device, based on user selection of the directionality, to enlarge or shrink images on the touch panel display, to:
   continuously enlarge the displayed image when the partial curved motion is counter-clockwise, and continuously shrink the displayed image when the partial curved motion is clockwise; or
   continuously enlarge the displayed image when the curved motion is clockwise, and to continuously shrink the displayed image when the curved motion is counter-clockwise.

21. The article of manufacture of claim 18, wherein execution of the programming instructions by the programmable controller further causes the electronic device to vary a rate of the enlarging or shrinking of the image displayed on the touch panel display with speed of the partial curved motion.

22. The article of manufacture of claim 18, wherein execution of the programming instructions by the programmable controller further causes the electronic device to vary a rate of the enlarging or shrinking of the image displayed on the touch panel display with size of a figure drawn by the partial curved motion.

23. The article of manufacture of claim 18, wherein execution of the programming instructions by the programmable controller further causes the electronic device to vary a rate of the enlarging or shrinking of the image displayed on the touch panel display as a function of content of the image displayed on the touch panel.

24. The method of claim 1, further comprising steps of:
   storing the detected test curved motion as a calibrated motion for the function, wherein the detected test curved motion at least substantially encircles an area and is permitted to be a figure that encircles essentially the same area multiple times.

25. The method of claim 1, wherein the continuous enlarging or shrinking of the displayed image on the touch panel display continues throughout detection of the partial curved motion.

26. The method of claim 1, wherein the detecting completion of drawing of the test curved motion includes determining whether curved motion is detected and requesting the drawing of the test curved motion until curved motion is detected.

* * * * *